Jan. 23, 1962     I. W. HILL     3,017,965
VEHICLE EMERGENCY BRAKE APPARATUS

Filed Sept. 28, 1959     2 Sheets-Sheet 1

INVENTOR.
IRA W. HILL
BY Loyal J. Miller
ATTORNEY

INVENTOR.
IRA W. HILL

ATTORNEY

United States Patent Office 3,017,965
Patented Jan. 23, 1962

3,017,965
VEHICLE EMERGENCY BRAKE APPARATUS
Ira W. Hill, 3004 SW. 50th, Oklahoma City, Okla., assignor of one-half to Arggle C. Hoffman, Oklahoma City, Okla.
Filed Sept. 28, 1959, Ser. No. 842,786
5 Claims. (Cl. 188—163)

The present invention relates to automobiles and more particularly to a device for operating the automobile emergency brake.

Most automobiles presently in use are equipped with manually controlled emergency brake means connected with at least two wheels of the vehicle. A number of automobiles have recently been equipped with means for easily releasing the emergency brake lever after the brake has been set. However, it still requires considerable force, manually exerted on the emergency brake lever, to set the emergency brake.

It is, therefore, the principal object of the instant invention to provide an electrical means for both setting and releasing automotive emergency brakes.

Another object is to provide an electrical apparatus, connected with the storage battery of the vehicle through the ignition switch will automatically "set" the emergency brake when the ignition switch is in "off" position and release the emergency brake when in "on" position.

Another object is to provide an electrically operated braking means which is returned to normal or released position by a spring.

A further object is to provide an apparatus of this class which is easily and quickly actuated by a single switch means forming a part of the automobile ignition switch and within easy reach of the operator.

Still another object is to provide a device of this class incorporating a safety feature comprising a switch which is closed by the foot pedal brake lever when the hydraulic or foot brake apparatus fails to function properly.

Still another object is to provide an apparatus of this class incorporating a wiring circuit which automatically interrupts the electrical brake actuating circuit when releasing the brakes.

The present invention accomplishes these and other objects by providing a heavy duty solenoid which is connected to the emergency brake cables by a heavy spring. Electrical wiring and switch means connects the solenoid to the automotive source of electrical energy. A Y-shaped plunger member actuated by the movement of the solenoid core, engages a recess formed in the solenoid core for maintaining the brakes in set position.

Other objects will be apparent from the following description when taken in conjunction with the accompanying two sheets of drawings, wherein.

Like characters of reference designate like parts in those figures of the drawings in which they occur.

In the drawings.

Figure 1:
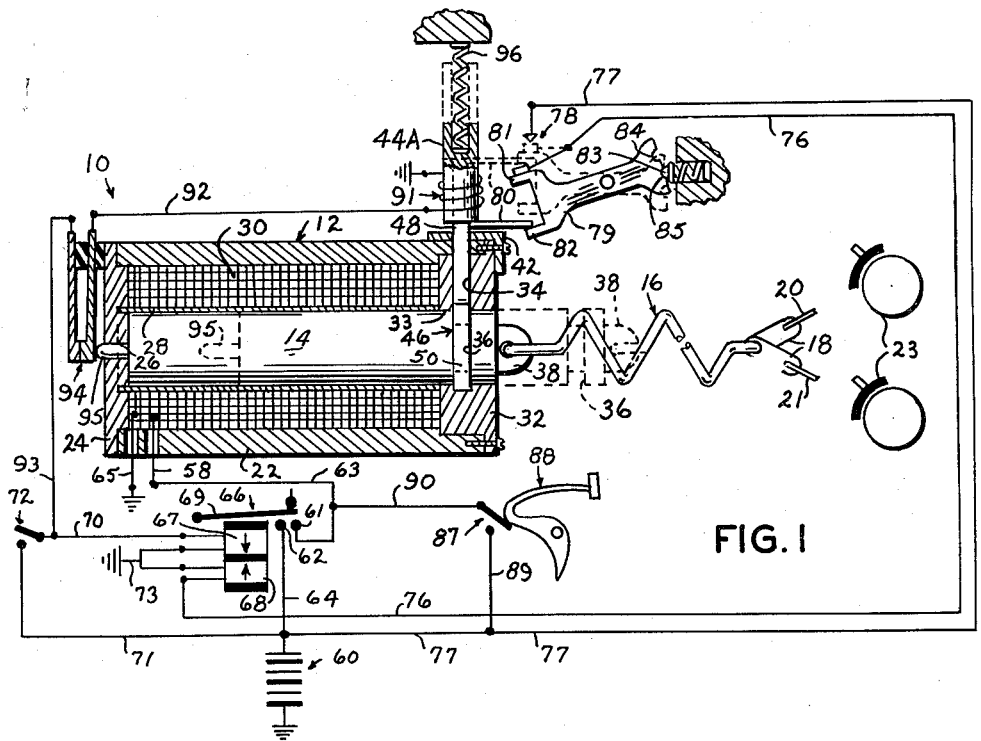
FIGURE 1 is a vertical cross-sectional, partly in elevation, of the solenoid and a schematic wiring diagram illustrating, one embodiment of the device in brake set position and illustrating, by dotted lines, a brake released position.

The reference numeral 10 indicates the device, as a whole, comprising a heavy duty solenoid 12, having a core or plunger 14 connected at one end with a helical spring 16, which is in turn connected with a pair of links 18, secured to emergency brake rods or cables 20 and 21 which are in turn secured to the emergency brakes 23. The solenoid 12 includes an outer body-portion 22 having one end 24 provided with a relatively small axial opening 26. The core 14 is closely received by a sleeve member 28 around which the solenoid coil winding 30 is placed. The other end of the solenoid body is closed by an end member 32 having an axial opening 33 slidably receiving the core 14 and having a slot 34 open to one side of the body 12. The solenoid core 14 is provided with an annular groove 36, adjacent its outwardly disposed end 38, which is co-operatingly aligned with the slot 34 when the core 14 is fully retracted.

Figure 4:
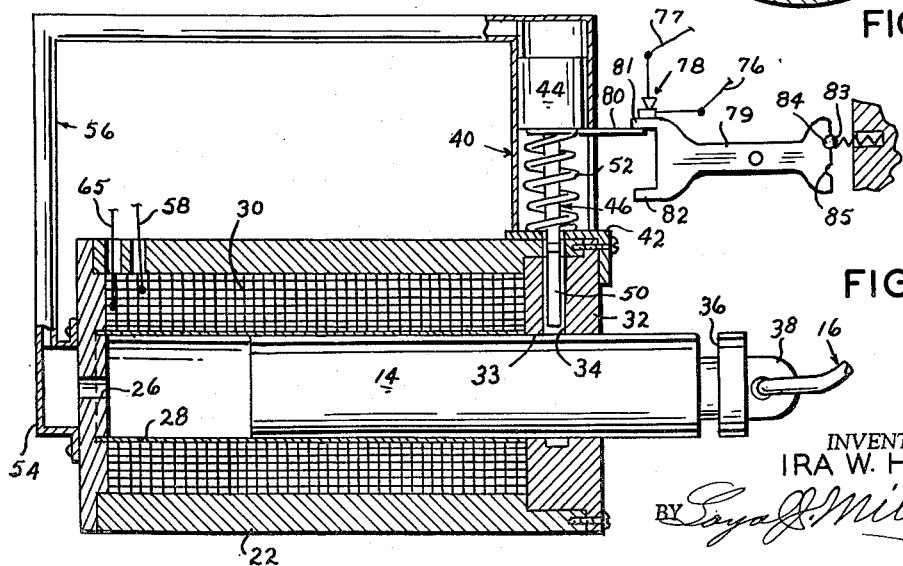
FIGURE 4 is a view similar to FIG. 3 illustrating another means for actuating the locking plunger; and, FIGURE 5 is a vertical cross-sectional view taken substantially along line 5—5 of FIG. 3.

Referring more particularly to FIG. 4, a cylindrical housing 40 is secured to the solenoid body 22 over the open end of the slot 34 by an L-shaped plate 42. The housing 40 closely receives a piston 44 rigidly connected axially to a locking plunger 46. The plunger 46 includes a stem portion 48 and a substantially Y-shaped depending end 50 which engages opposing sides of the core member 14 by entering the recess 36 in a manner presently to be explained.

A helical spring 52, interposed between the piston 44 and L-shaped member 42, normally maintains the locking member 46 in retracted position (FIG. 4). A small airtight enclosure 54 is secured to the solenoid end 24 around the opening 26 and is connected by a tubular member 56 to the upper end portion of the housing 40 for communication between the bore of the sleeve 28 and the bore of the housing 40.

One terminal 58 of the solenoid coil winding 30 is connected to a source of electrical energy, such as the automotive battery 60, through a pair of normally open contacts 61 and 62 by wires 63 and 64. The other solenoid coil terminal 65 is connected to ground.

A relay 66, having a pair of oppositely wound coils 67 and 68, attracts a contact member 69, which bridges the contacts 61 and 62, when either one of the coils is energized. A pair of wires 70 and 71 connects one terminal of the relay coil 67 to the battery through a switch 72. The switch 72 represents the conventional ignition switch to which the wires 70 and 71 are connected. The other terminal of the coil 67 is connected to one terminal of the coil 68 and is grounded by a wire 73. The other terminal of the coil 68 is connected to the battery 60 by a pair of wires 76 and 77 through a second switch means 78.

The switch 78 is opened and closed by a pawl 79, pivotally connected to the vehicle, adjacent the cylindrical housing 40, and is pivoted between switch opened and closed positions by an arm 80, connected to the piston member 44, whereby its free end engages opposing arms 81 and 82 of a substantially Y-shaped end of the pawl. The pawl is maintained in switch opened or closed position by a spring urged ball 83 engaging recesses 84 and 85, respectively, in the end of the pawl opposite its Y-shaped end.

Figure 2:
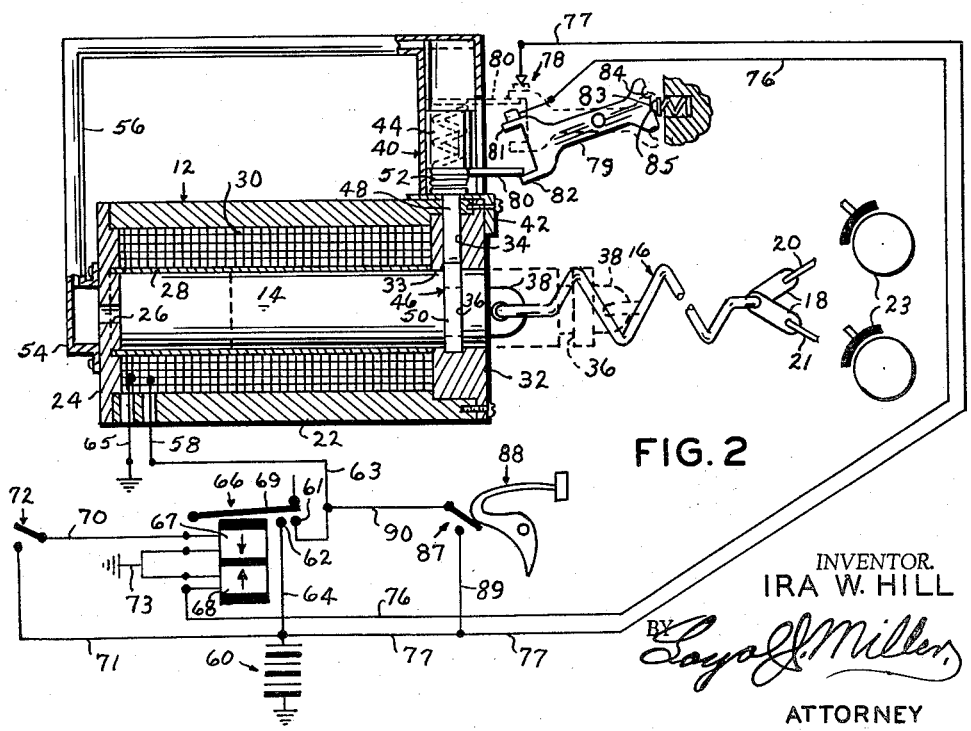
FIGURE 2 is a view similar to FIG. 1 illustrating another embodiment of the apparatus.

Referring to FIG. 2, the brakes are released by turning the ignition "on" which closes the switch 72 and energizes the coil 67 of the relay 66 which pulls the contact member 69 "in" and bridges the contacts 61 and 62 thus energizing the solenoid 12, moving the core 14 inwardly of the solenoid housing a slight distance to the left as viewed in FIG. 2, which frees the locking plunger 46 from engagement with the core and allows the plunger to be retracted or moved upwardly by the spring 52. Upward movement of the piston 44 engages the arm 80 with the pawl arm 81 closing the switch 78, as shown in FIG. 4. This completes a circuit through coil 68, over wires 76—77 to ground, which cancels the energizing attraction of the coil 67 for the contact member 69, thus releasing, or restoring, the latter and interrupting the current to the solenoid 12, permitting the spring 16 to move the solenoid core 14 outwardly of the solenoid housing to the position of the core shown in FIG. 4 wherein the brakes are released. This brake releasing action is accomplished simultaneously with the ignition key operation in starting the vehicle engine.

When the switch 72 remains closed, the coil 67 remains energized and the switch 78 is maintained closed thus energizing the coil 68 which cancels coil 67 and de-energizes solenoid 12. When the switch 72 is opened as, for example, when stopping the engine, current flow through the coil 67 is interrupted leaving coil 68 energized which pulls the contact member 69 "in" and bridges the contacts 61 and 62, thus energizing the solenoid 12 which retracts its core 14 inwardly or to the left, as viewed in FIG. 4. Inward movement of the core 14 forces air out of the sleeve 28 through the opening 26 and into the bore of the housing 40 through the tubular member 56; the air pressure thus generated and applied to the upper end of the piston 44 moves the piston downward, as seen in FIG. 2, forcing the plunger 46 into locking engagement within the solenoid core recess 36. Inward movement of the core 14 exerts a pull on the emergency brake cables or rods 20 and 21 through the spring 16 and links 18. Thus, the spring 16 allows for variation in the movement required for applying the brakes; as for example, the brake rods 20 and 21 are moved only a short distance when the brake linings are new and moving a proportionately greater distance as the brake linings become worn; in other words, the spring 16 permits the solenoid core 14 to be fully retracted within the solenoid 12 to insure alignment of the recess 36 with the slot 34. Downward movement of the piston 44 engages the arm 80 with the pawl arm 82 and opens the switch 78 interrupting the current to the coil 68 and de-energizing the relay 66. In other words when the ignition key is in "on" position the emergency brakes are released and when the ignition key is turned "off" the emergency brakes are "set."

An additional safety feature is incorporated in the apparatus whereby the solenoid 12 may be automatically energized for applying the emergency brakes whenever the conventional hydraulic braking system fails to operate for any reason. This safety feature comprises a normally open switch 87, associated with the conventional brake lever 88, whereby complete depression of the brake pedal closes the switch 87 and completes a circuit through the solenoid coil 30, over a pair of wires 89 and 90, connected with the hot wire 77 and the solenoid coil wire 58, respectively.

Figure 3:
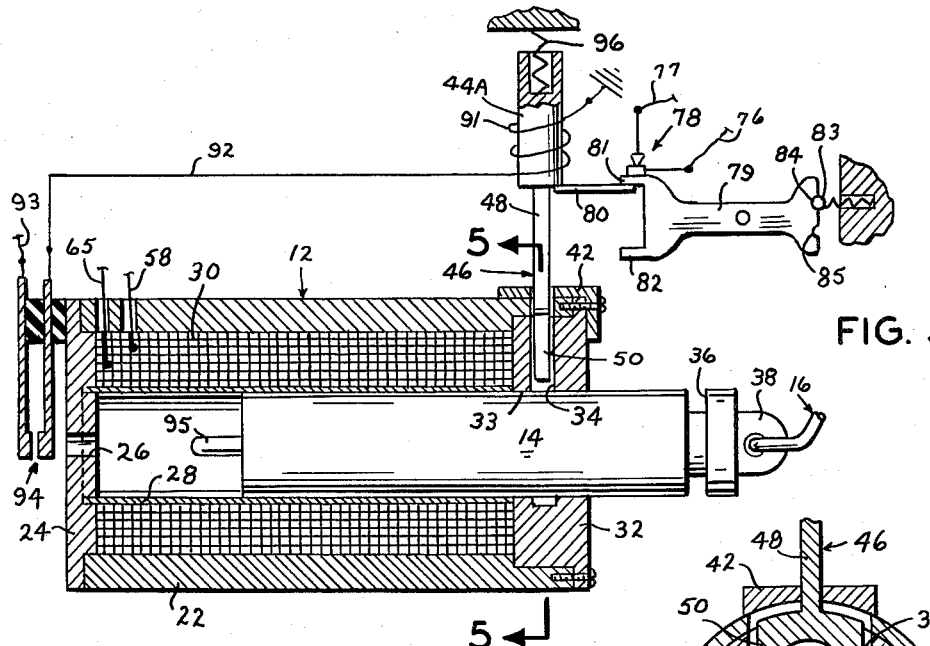
FIGURE 3 is a vertical cross-sectional view, partly in elevation, of the brake actuating solenoid and locking plunger in brake released position.
Figure 5:
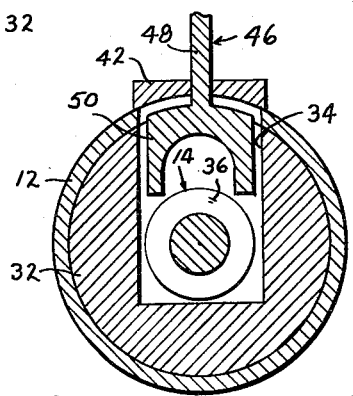

FIGS. 1 and 3 illustrate an alternate manner of actuating the plunger 46 by winding a coil 91 around a cylindrical core 44A connected to the shaft 48 of the plunger member 46. One end of the coil 91 is connected to ground and the other end is connected to the wire 70, over a pair of wires 92 and 93, through a switch 94. The switch 94 is positioned adjacent the solenoid aperture 26 so that a pin 95 axially connected to the adjacent end of the core 14 projects outwardly of the solenoid end 24 through the opening 26 and closes the switch 94 when the core 14 is fully retracted within the solenoid.

A spring 96, interposed between the free end of the core 44A and a portion of the vehicle, forces the plunger into locking engagement within the recess 36 of the core 14 as the core moves inwardly of the solenoid 12. The brakes are released in this alternate embodiment in a manner similar to that disclosed hereinabove for FIGS. 2 and 4, wherein when the switch 72 is closed the core 14 is moved inwardly of the solenoid body 12 a slight distance which frees the plunger 46 and permits the coil 91, energized by the closed switch 94, to move the core 44A upwardly by compressing the spring 96 and thus lifting the plunger 46 out of engagement with the core 14. This action closes the switch 78, as shown in FIG. 3, and interrupts the solenoid energizing circuit in the manner disclosed hereinabove.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A brake setting device for a vehicle having a brake pedal and having an emergency brake mechanism associated with at least two wheels of the vehicle, including: a solenoid carried by the vehicle and having a movable core provided with a recess adjacent one end thereof, said solenoid having a laterally open slot co-operatingly aligned with the recess when the core is retracted; a spring interposed between and connected at its respective ends to one end of said solenoid core and said emergency brake mechanism; electric wiring connecting said solenoid with a source of electrical energy; a first switch means interposed in said electrical wiring for energizing said solenoid and applying said emergency brakes; a cylindrical housing connected with said solenoid around the open end of the slot; a piston within said cylindrical housing; a locking plunger axially connected to said piston and adapted to enter the recess in said core when the solenoid is energized; a tubular member extending between and connected with the outwardly disposed end of said cylindrical housing and the apertured end of said solenoid for communication between the interior of said solenoid and the bore of said cylindrical housing, whereby said solenoid core forces air under pressure against said piston for moving said locking plunger into the recess of said core when said solenoid is energized to set said emergency brakes; and means for releasing said emergency brakes, said means comprising, a spring interposed between said piston and said solenoid for removing said locking plunger from within the recess in said core when said solenoid is re-energized, and a second switch interposed in said electrical wiring and adapted to be closed by the movement of said piston away from said core for interrupting the current to said solenoid.

2. Structure as specified in claim 1 and a third normally open switch mounted adjacent said brake pedal and connected by wiring to said solenoid and a source of electrical energy for energizing said solenoid when said third switch is closed by the complete depression of said brake pedal.

3. A brake setting device for a vehicle having a brake pedal and having brake mechanism associated with at least two wheels thereof, including: a solenoid carried by the vehicle and having a core provided with a recess adjacent one end thereof, said solenoid having a laterally open slot cooperatingly aligned with the recess when the core is retracted; a spring interposed between and connected, at its respective ends, with said core and said brake mechanism; electric wiring connecting said solenoid to a source of electrical energy; a first switch means connected with said wiring for energizing said solenoid and actuating the brakes; a locking plunger slidably mounted within the laterally open slot in said solenoid and having a bifurcated end portion adapted to enter the recess in said core when said solenoid is energized for locking the brakes in wheel braking position; means connected with said locking plunger for moving the latter into locking position within the recess in said core; and a second switch means interposed in said wiring adjacent said brake pedal and adapted to be closed by said brake pedal when the brake is completely depressed to energize said solenoid.

4. A brake setting device for a vehicle having a brake pedal and having emergency brake mechanism associated with at least two wheels thereof, including: a solenoid carried by the vehicle and having a movable core provided with an annular recess adjacent one end thereof, one end portion of said solenoid having a laterally open slot cooperatingly aligned with the recess when the core is retracted; a spring interposed between and connected at its respective ends to said core and said emergency brake mechanism; electric wiring connecting said solenoid with a source of electrical energy; a first switch means interposed in said wiring for energizing said solenoid and applying said emergency brakes; a locking plunger slidably mounted within the laterally open slot in said solenoid, said plunger having a bifurcated end portion adapted to enter the recess in said core when the solenoid is energized; means connected with said locking plunger for moving the latter into locking position within the annular recess in said core; and a second switch means interposed in said wiring adjacent said brake pedal and adapted to be closed by the latter for energizing said solenoid and applying said emergency brakes when said brake pedal is completely depressed.

5. Structure as specified in claim 4 and means for moving said locking plunger out of the annular recess of said core and releasing said emergency brake mechanism, said means including an opening formed in the end of said solenoid housing opposite the end having the laterally open slot; a pin secured to the inwardly directed end of said solenoid core, said pin projecting through the opening in said solenoid housing when the core is retracted; a third normally open switch mounted on said solenoid adjacent the opening therein adapted to be closed by said pin when the solenoid is energized; a coil connected with said plunger for moving the latter out of the recess in said core; and other wiring connecting said coil to said first switch through said third switch.

References Cited in the file of this patent

UNITED STATES PATENTS

| | | |
|---|---|---|
| 1,308,460 | Waldon | July 1, 1919 |
| 1,843,966 | Adams | Feb. 9, 1932 |
| 2,789,667 | Tannenbaum et al. | Apr. 23, 1957 |
| 2,871,827 | Euga | Feb. 3, 1959 |

FOREIGN PATENTS

| | | |
|---|---|---|
| 434,791 | Germany | Oct. 2, 1926 |